INVENTOR.
CLINTON T. COOPER

United States Patent Office 3,235,059
Patented Feb. 15, 1966

3,235,059
MANIPULATIVE CONVEYOR SYSTEM FOR
ELONGATED ARTICLES
Clinton T. Cooper, 372 Melbourne Ave.,
Youngstown, Ohio
Filed Oct. 31, 1963, Ser. No. 320,303
5 Claims. (Cl. 198—33)

This invention relates to material handling equipment and more particularly to a conveyor system for transporting and manipulating elongated articles such as lengths of metallic extrusions, formed steel sections, etc. While the system has been specifically devised for and possesses substantial utility in plants for coating elongated articles, and will be so described, it is conceivable that it may be advantageously used for other purposes, including fabrication lines.

Critical problems arise in laying out a plant to expeditiously effect sequential operations on elongated objects which may be of the order of sixteen–forty feet in length, particularly when it is desired tto achieve practical automation in the handling of the objects. Coating and other processes preclude the batch method of routing the stock through the plant because of spatial interference between the pieces of each batch and the impracticability of breaking down and reconstituting each batch for the separate sequential operations. It is accordingly desirable that the articles be loaded but once on a continuous conveyor system in such manner that they may be worked on while supported on the system. It is also desirable that the path of conveyance be circuitous within the plant enclosure so that the plant equipment such as washers, dryers and paint booths may be assembled in closely adjacent positions for space economy and so that the individual items of equipment may be kept as small as possible.

The above objects are accomplished by the principles of my invention by suspending the articles from the conveying system in generally horizontal positions and by laying out the conveying system in such manner that the articles at times move transversely of their longitudinal axes for loading, unloading and transference purposes to be described, and at other times longitudinally for threading through washing, drying, and paint spray chambers, for example. It should be apparent that the latter concept makes for maximum efficient use of the operational facilities.

It has heretofore been proposed in setting up a continuous processing line for elongated articles to suspend the articles vertically from a continuous conveyor but this requires extensive headroom in the plant building and processing equipment of very extensive vertical dimension due to the requirement that the entire length of the objects be worked on at the same time. In contrast to this, my system longitudinally threads the objects through the processing equipment so that the working stations are of practical size, and since the objects move horizontally, only reasonable building headroom is required.

It is accordingly a further object of my invention to provide a conveyor system for elongated objects to be processed whereby the processing equipment may be more compact and close-coupled than heretofore and thus capable of being installed in a building of minimum dimensions as to width, length, and height.

The above and other objects and advantages of the invention will become apparent upon consideration of the following specification and the accompanying drawing wherein there is disclosed a preferred embodiment of the invention.

Figure 1:
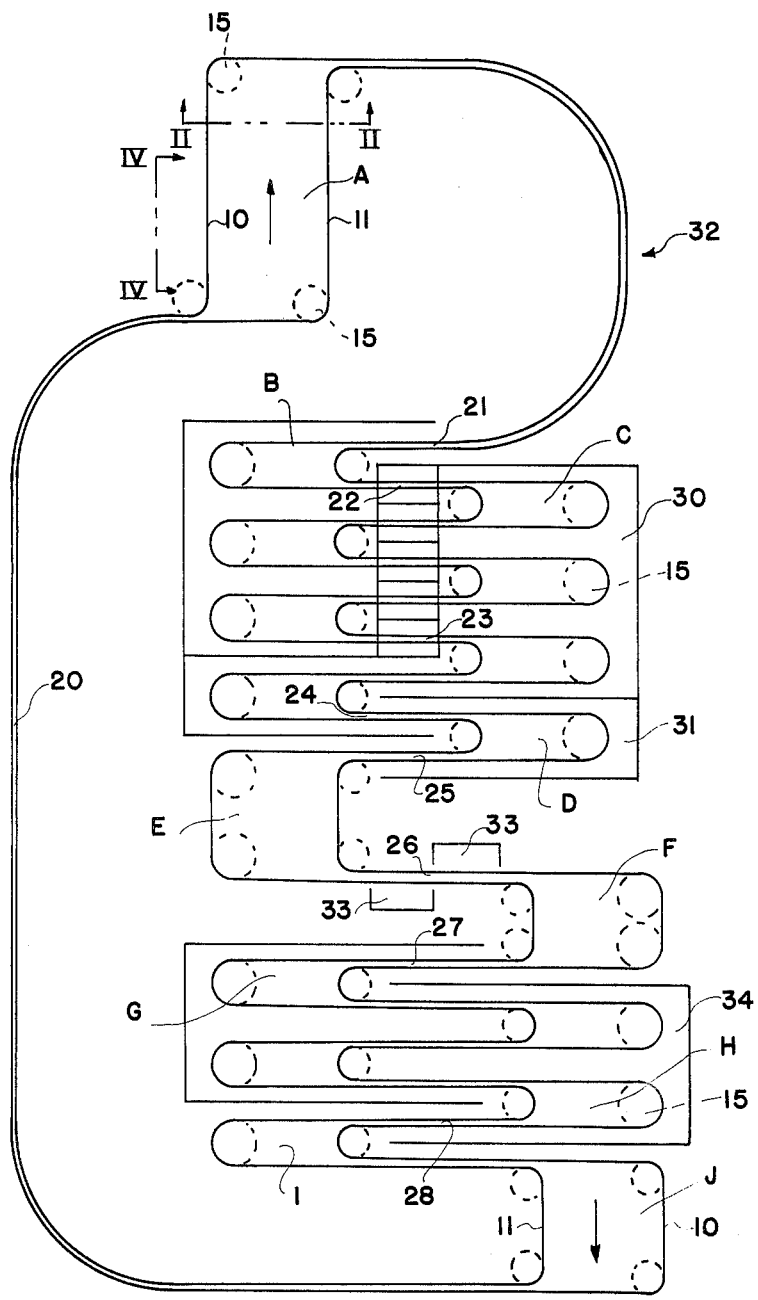
FIGURE 1 is a schematic plan view of a conveyor installation constructed in accordance with the principles of the invention.

In accordance with this invention, I provide a pair of generally parallel and endless overhead chain conveyors which are shown only schematically in FIGURE 1, being designated by reference numerals 10 and 11. The individual structure of these conveyors is conventional and well known in the art, being of the general kind illustrated and described in Frederick U.S. Patent No. 2,493,807, for example. Thus, and as shown herein in FIGURE 2, each of the conveyors has a properly curved upper beam 12 constituting a supporting track for a roller chain 13 which is supported from the track by means of dolleys 14. As shown, the chains 13 are positioned on edge in depending relation to the dolleys 14, and in accordance with known practice are entrained over sprockets (15, FIG. 1) at sharp corners of the conveyors and, if required, are otherwise suitably guided on more gentle curves. Suitable means, not shown, but which may conveniently comprise some of the sprockets 15 is provided to drive the chains 13 along their paths, and the two driving assemblies are interconnected so that the chains move synchronously for a purpose to be later described.

Figures 2, 3:
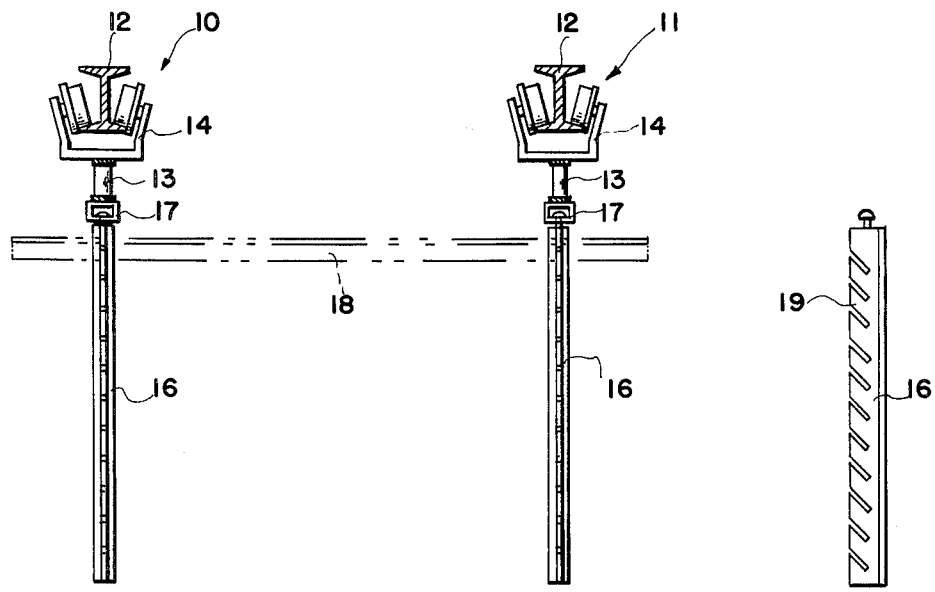
FIGURE 2 is a sectional view of the apparatus of FIGURE 1, taken along the line II—II of FIGURE 1.
FIGURE 3 is a side view of one of the vertical depending carriers used in the assembly of FIGURES 1 and 2.

From a study of FIGURE 1, it will be apparent that the two conveyors 10 and 11 have portions or reaches in which they are widely separated as at locations A, B, C, D, E, F, G, H, I and J. Of course, the number, location, and orientation of these spaced reaches will depend on the manipulative path desired for the elongated articles suspended from the conveyors. FIGURES 2 and 3 illustrate how these articles may be suspended from the conveyors in furtherance of the objects of the invention.

Referring now to FIGURES 2 and 3, reference numeral 16 designates vertically disposed carriers which are suspended from the chains 13 by special couplers 17. For a purpose to be later described, these couplers 17 may be of the quick detachable and attachable kind and in any event they are of a construction which permits the carriers 16 to swivel about vertical axes with respect to the reaches of the chains 13 from which they are supported. The elongated objects to be transported and processed are represented in FIGURE 2 by a length bearing reference numeral 18, and for illustration purposes this object may be considered as a length of angular section which is received and retained in slots 19 formed in the carrier 16. The carriers 16 and the expedient for retaining the workpieces on the carriers may take many different forms, depending on the work at hand but, most commonly, it is desirable to group the workpieces in a vertically spaced parallel array and in a single tier. This arrangement is ideal for washing, drying and coating the elongated objects if and when the carrier 16 and the retainers 19 are so devised as to provide minimum interference with the access to the outer surfaces of the workpieces. For example, if the workpieces have spaced apertures as they commonly do, they may be supported on the carriers by simple wire hooks which are received in certain of the apertures.

Referring back to FIGURE 1 of the drawing, it should be observed that the conveyors 10 and 11 are mounted in close parallel juxtaposition in zones or locations intermediate the wide areas referred to above by notations A thru J, for example. Thus, one such zone of closely spaced conveyors is shown at 20 in FIGURE 1 and others at 21 thru 28. The workpieces 18 are loaded on the carriers 16 in such manner that one end portion of the workpieces is supported by conveyor 10 while the other end portion is supported by conveyor 11, all as evident from FIGURE 2. If now a particular workpiece is moving through one of the wide areas A, B, etc. it will be apparent that the workpiece will have horizontal movement in a direction transverse of its longitudinal axis. When moving through one of the intermediate zones 20, 21, etc., the workpiece will have horizontal movement in a direction correspondent with its longitudinal axis. This principle of movement pattern is advantageously utilized in the applications of my invention, one of which will now be explained in connection with FIGURE 1.

In FIGURE 1, reference numeral 30 represents a multiple-pass washing and phosphating unit while reference numeral 31 illustrates a drying oven mounted at the outlet end of the washing and phosphating unit. This latter unit has a plurality of parallel working passes, the first of which is coincident with the conveyor zone 22 while the last of which is at the conveyor zone 23. As will be explained hereafter, area A is a loading station at which pairs of carriers 16 each filled with a single tier of workpieces are, in succession, coupled onto the chains 13 of the conveyors 10 and 11. This may be done in an automatic manner through mechanical arrangements known in the conveyor art and therefore not per se a part of the present invention. Upon reaching the end of zone A, the workpieces begin their longitudinal movement and after traversing curve 32 pass into the entry slit of washer 30 at the conveyor section 21. At conveyor zone B the tier of supported workpieces moves laterally into alignment with the first operative pass to the washer which is at conveyor section 22. The work then moves back and forth through the washing, rinsing and phosphating passes until it enters the drying oven 31. As is well known, such drying equipment operates with a blast of heated air and it is of course desirable that its outer casing be fairly air tight. This is facilitated by having the elongated workpieces move horizontally and longitudinally into and out of the casing since then the entry and exit openings can be mere slits to reduce the loss of heated air and to facilitate the installation of yieldable barriers or baffles if this is considered necessary in the installation.

From the dryer 31 the tier of workpieces is transferred laterally at zone E into alignment with the longitudinal pass 26. On either side of this pass is a spray device 33 to coat opposite sides of the workpieces as they progress longitudinally along the pass. By concentrating the equipment 33, its operation is much more efficient and economical and can be devised and arranged to do a complete coating job even under fully automatic conditions. From the spray station the tier of workpieces is shifted laterally at F into alignment with the longitudinal entry pass 27 into oven 34 which is commonly used for the quick drying of enamels used in coating processes. Again, the longitudinal entry of the stock permits the entry opening of the oven casing to be quite small or thin to thereby minimize the loss of heat and/or facilitate the installation of flexible baffles or flaps as explained above. The conveyors 10, 11 may otherwise be totally enclosed within the oven housing, and the length of the conveyor within the housing and consequently the baking time cycle may be readily varied by varying the number of sinuous loops installed. The arrangement is compact, however, and efficient use is made of the rectangular space normally available within factory buildings. Again, the exit from the baking oven may again be a relatively narrow slit for minimum loss of heat and/or for ease in installing heat-retaining baffles.

Figure 4:
FIGURE 4 is a schematic showing in side elevation of a portion of the conveyor of FIGURE 1, the view being taken along the line IV—IV of FIGURE 1.

After leaving the exit opening of bake oven 34 along longitudinal pass 28 of the conveyor system the tiers of finished workpieces may be shifted laterally at I and thence longitudinally to a zone J where the workpieces of each tier may be unloaded manually or the tiers including their carrier 16 detached bodily from the chains 13 as will be understood. To facilitate the detachment of the carrier 16 at the area J, the conveyors 10 and 11 may be formed with a dip such as illustrated in FIGURE 4 for the loading station A. The purpose of the dip in the tracks 10, 11, at the loading station A is to automatically bring the couplers 17 down into engaging relation with a pair of carriers 16 which at a proper time is moved into proper "pickup" position by a movable rack, not shown. At unloading station J a similar rack receives the loaded pair of carriers from the conveyor chains. Such transferring or loading and unloading arrangements are well known in the automatic conveyor art and accordingly do not per se form any part of the present invention.

It should now be apparent that I have provided an improved manipulative conveyor system for elongated objects which accomplishes the objects initially set out above. By providing for the controlled lateral movement of the elongated articles as well as for the horizontal longitudinal movement thereof, it is possible to establish practical and automatic loading and unloading stations for the stock and to effect quick shifting of the stock into alignment with the various longitudinal passes in the processing equipment. Intermediate the areas or zones of lateral movement the stock has longitudinal movement during which sequential operations may be performed on the stock. By so shuttling the stock back and forth and laterally into successive working stations the processing equipment may be kept highly centralized and compact which facilitates control and keeps the overall dimensions of the plant down to a practical size.

The system of the invention may also be used for dip-coating the elongated articles and for loading the same into and out of an oven; for example, by lateral movement of the articles. For such purposes a dip or depression would be formed in the supporting conveyors as shown in FIGURE 4. This would permit the dip tank to be made of minimum size, and in the case of ovens permit the articles to enter and leave the heat zone at lower positions where there would be less heat loss.

Having thus described my invention what I claim is:

1. A manipulative conveyor system for elongated articles wherein said articles are held in horizontal positions and are adapted to have generally horizontal movement in directions both longitudinal and transverse of their principal axes comprising in combination a pair of endless conveyor chains each arranged in unbroken closed circuit, an endless supporting track for each of said chains, means movable along said tracks and depending therefrom for supporting said chains, vertically disposed hangers swivably suspended from said chains for rotation about vertical axes relative to the reaches of the chains from which they are supported, said hangers being operative to support end portions of said articles and the arrangement being such that one end portion of each article may be supported from one of said chains while the other end portion of the article is supported from the other of said chains, means to drive said chains synchronously at the same speed and to maintain said chains in generally vertical alignment with their respective supporting tracks, said tracks and chains when viewed in plan being generally parallel and closely spaced at some locations to effect principally longitudinal movement of said articles while being widely spaced at other locations to effect transverse movement of the artices relative to their principal axes.

2. A manipulative conveyor system for elongated articles comprising a pair of overhead chain-type of conveyors arranged in side-by-side relation each in an unbroken closed circuit, means to individually drive the chains of said conveyors but synchronously with respect to each other and at the same speed so that the relative positions of a pair of points on said chains is controlled according to a predetermined positional pattern, a carrier suspended from each of said chains at said points, said carriers being adapted to support opposite end portions of an elongated article being conveyed, and said conveyors being closely spaced at one location and widely spaced at an adjacent location whereby said elongated article suspended from the chains thereof may shift from a predominantly longitudinal motion to a lateral motion upon running of the chains.

3. A plant installation for processing elongated articles comprising processing equipment having a plurality of side-by-side processing stations through which said articles move longitudinally, a pair of endless overhead conveyors each arranged in an unbroken closed circuit and means depending from each of said conveyors to support an end portion of an elongated workpiece, means to drive said conveyors synchronously and at the same speed, and said conveyors being generally aranged in side-by-side relation but closely spaced in some locations and widely spaced in other locations whereby said workpiece may have predominantly longitudinal movement while passing through said stations while having lateral movement when moving from one station to another.

4. A manipulative conveyor system for elongated articles wherein said articles are held in horizontal positions and are adapted to have generally horizontal movement in directions both longitudinal and transverse of their principal axes comprising in combination a pair of endless overhead conveyors having straight and curved sections, each of said conveyors arranged in an unbroken closed circuit, means to drive said conveyors synchronously and at the same speed whereby a point on one of said conveyors will always be positionally related to a point on the other of said conveyors according to the predetermined pattern of said circuit, a carrier for one of the elongated articles depending from each of said points and in turn carried by said conveyors, said carriers having swivel connections to said conveyors whereby said carriers may rotate about vertical axis relative to said conveyors, said carriers adapted to support opposite end portions of said article, said conveyors being positioned in general side-by-side relation but when viewed in plan having widely spaced sections separated by closely adjacent sections whereby said article moves sideways along the first of said sections and generally lengthwise along the second of said sections.

5. A conveying system according to claim 4 further characterized in that the paths of said conveyors progress around a 90° curve in passing from said widely spaced sections to said closely adjacent sections.

References Cited by the Examiner
UNITED STATES PATENTS

| | | | |
|---|---|---|---|
| 1,951,400 | 3/1934 | Dvorak | 198—177 |
| 2,067,981 | 1/1937 | Ohlson | 198—177 X |
| 3,099,226 | 7/1963 | Kokoras | 104—91 |

SAMUEL F. COLEMAN, *Primary Examiner.*

EDWARD A. SROKA, *Examiner.*